United States Patent [19]
Kinkead et al.

[11] Patent Number: 5,833,726
[45] Date of Patent: Nov. 10, 1998

[54] STORING SUBSTRATES BETWEEN PROCESS STEPS WITHIN A PROCESSING FACILITY

[75] Inventors: Devon A. Kinkead, Cumberland, R.I.; Michael A. Joffe, Millis, Mass.

[73] Assignee: Extraction System, Inc., Franklin, Mass.

[21] Appl. No.: 451,891

[22] Filed: May 26, 1995

[51] Int. Cl.⁶ .................................................. B01D 46/00
[52] U.S. Cl. ........................ 55/356; 55/385.1; 55/385.2; 454/187
[58] Field of Search ............................... 55/385.1, 385.2, 55/467, 471, 472, 473, 356; 454/187, 188, 189, 190

[56] References Cited

U.S. PATENT DOCUMENTS

| | | | |
|---|---|---|---|
| 4,532,970 | 8/1985 | Tullis et al. | 141/98 |
| 4,534,389 | 8/1985 | Tullis | 141/98 |
| 4,660,464 | 4/1987 | Tanaka | 98/115.3 |
| 4,666,479 | 5/1987 | Shoji | 55/385.1 |
| 4,668,484 | 5/1987 | Elliot | 55/385.1 |
| 4,684,021 | 8/1987 | Niebling et al. | 206/334 |
| 4,709,834 | 12/1987 | Mortensen et al. | 220/326 |
| 4,724,874 | 2/1988 | Parikh et al. | 141/98 |
| 4,770,680 | 9/1988 | Machida et al. | 55/385.1 |
| 4,851,018 | 7/1989 | Lazzari et al. | 55/356 |
| 4,927,439 | 5/1990 | Mears et al. | 55/385.2 |
| 4,963,069 | 10/1990 | Wurst et al. | 414/416 |
| 5,122,170 | 6/1992 | Satoh et al. | |
| 5,166,530 | 11/1992 | McCleary | |
| 5,181,819 | 1/1993 | Sakata et al. | 414/217 |
| 5,219,464 | 6/1993 | Yamaga et al. | 55/385.1 |
| 5,221,573 | 6/1993 | Baigas, Jr. | |
| 5,255,783 | 10/1993 | Goodman et al. | 206/334 |
| 5,261,935 | 11/1993 | Ishii et al. | 55/385.2 |
| 5,271,780 | 12/1993 | Baigas, Jr. | |
| 5,295,522 | 3/1994 | DeAngelis et al. | 141/98 |
| 5,346,518 | 9/1994 | Baseman et al. | 55/267 |
| 5,350,336 | 9/1994 | Chen et al. | 55/385.2 |
| 5,351,415 | 10/1994 | Brooks et al. | 34/389 |
| 5,390,785 | 2/1995 | Garric et al. | 206/213.1 |
| 5,411,358 | 5/1995 | Garric et al. | 414/277 |

(List continued on next page.)

FOREIGN PATENT DOCUMENTS

| | | |
|---|---|---|
| 61-262537 | 11/1986 | Japan. |
| 4-243711 | 8/1992 | Japan .................................. 55/385.2 |
| WO 90/05549 | 5/1990 | WIPO. |

OTHER PUBLICATIONS

Saiki et al., "Development of Ammonia Adsorption Filter and Its Application to LSI Manufacturing Enviroment", Jpn. J. Appl. Phys. vol. 33, pp. 2504–2508, May 1994.

Martin Ferm, "Method for Determination of Atmospheric Ammonia", Atmospheric Environment, vol. 13, pp. 1385–1393, 1979.

(List continued on next page.)

*Primary Examiner*—Duane S. Smith
*Attorney, Agent, or Firm*—Fish & Richardson P.C.

[57] ABSTRACT

A scheme for defining, inside a processing facility, a storage environment that is substantially free of a targeted molecular contaminant and in which one or more substrates are to be stored for a period of time before or after a substrate processing step; the scheme including: an air blower for providing a flow of air within a storage environment defined inside a processing facility; a substrate support for holding one or more substrates inside the storage environment; and a molecular air filter having an input face positioned to receive air from the blower and having an output face for providing a flow of filtered air inside the storage environment, the molecular air filter being constructed and arranged to remove an airborne molecular contaminant from air flowing into the storage environment to achieve a concentration level of the molecular contaminant inside the storage environment suitable for storing one or more substrates therein for a sit time corresponding to the time before a subsequent substrate processing step; wherein the storage environment is substantially free of the targeted airborne molecular contaminant. Schemes for defining substrate storage environments for semiconductor device fabrication processes are also disclosed.

39 Claims, 8 Drawing Sheets

U.S. PATENT DOCUMENTS

| | | | |
|---|---|---|---|
| 5,413,527 | 5/1995 | Dansui et al. | 454/57 |
| 5,434,644 | 7/1995 | Kitano et al. | 355/30 |
| 5,459,943 | 10/1995 | Tanahashi | 55/385.2 |
| 5,462,485 | 10/1995 | Kinkead | 454/256 |
| 5,472,086 | 12/1995 | Holliday et al. | 206/711 |
| 5,476,176 | 12/1995 | Gregerson et al. | 206/711 |
| 5,514,196 | 5/1996 | Tanahashi et al. | 55/385.2 |
| 5,582,865 | 12/1996 | Rezuke et al. | 427/244 |
| 5,626,820 | 5/1997 | Kinkead et al. | 55/385.2 |

OTHER PUBLICATIONS

Amos Turk et a., "Tracer gas nondestructive testing of activated carbon cells," Materials Research & Standards, pp. 24–26 (Nov. 1969).

Shendrikar et al., "Microdetermination of Ammonia by the Ring Oven Technique and its Application to Air Pollution Studies", Atmospheric Environment, vol. 9, pp. 431–435, 1974.

Oikawa et al., "Efect of Reducing the Contaminant Concentration When Patterning a Chemically Amplified Positive Resist", Proceedings of SPIE '95, Microlithography, 19–24 Feb., 1995, Santa Clara, California Extraction System, Inc., Product Catalog, 1993.

Devon A. Kinkead, "The Incorporation and Use of Reagent Impregnated Activated Carbons in Nonwoven Webs", Proceedings of the International Technical Conference on Filtration and Separation, 1988.

Helms et al., "Mechanisms of the $HF/H_2O$ Vapor Phase Etching of $SiO_2$", J. Vac. Sci. Technol. A 10(4), Jul./Aug. 1992, pp. 806–811.

Inoue et al., "Study on Boron Contamination in Clean Room", Proceedings of the 12th ISCC in Yokohama, 1994, pp. 111–116.

Stevie et al., "Boron Contamination of Surfaces in Silicon Microelectonics Processing: Charaterization and Causes", J. Vac. Sci. Technol.A, 9–5 (1991), 2813–2816.

Paper 2438–2450 entitle "Effect of Reducing the Contaminant Concentration When Patterning a Chemically Amplified Positive Resist", Proceedings of SPIE '95 Microlithography 19–24 Feb. 1995, Santa Clara, CA.

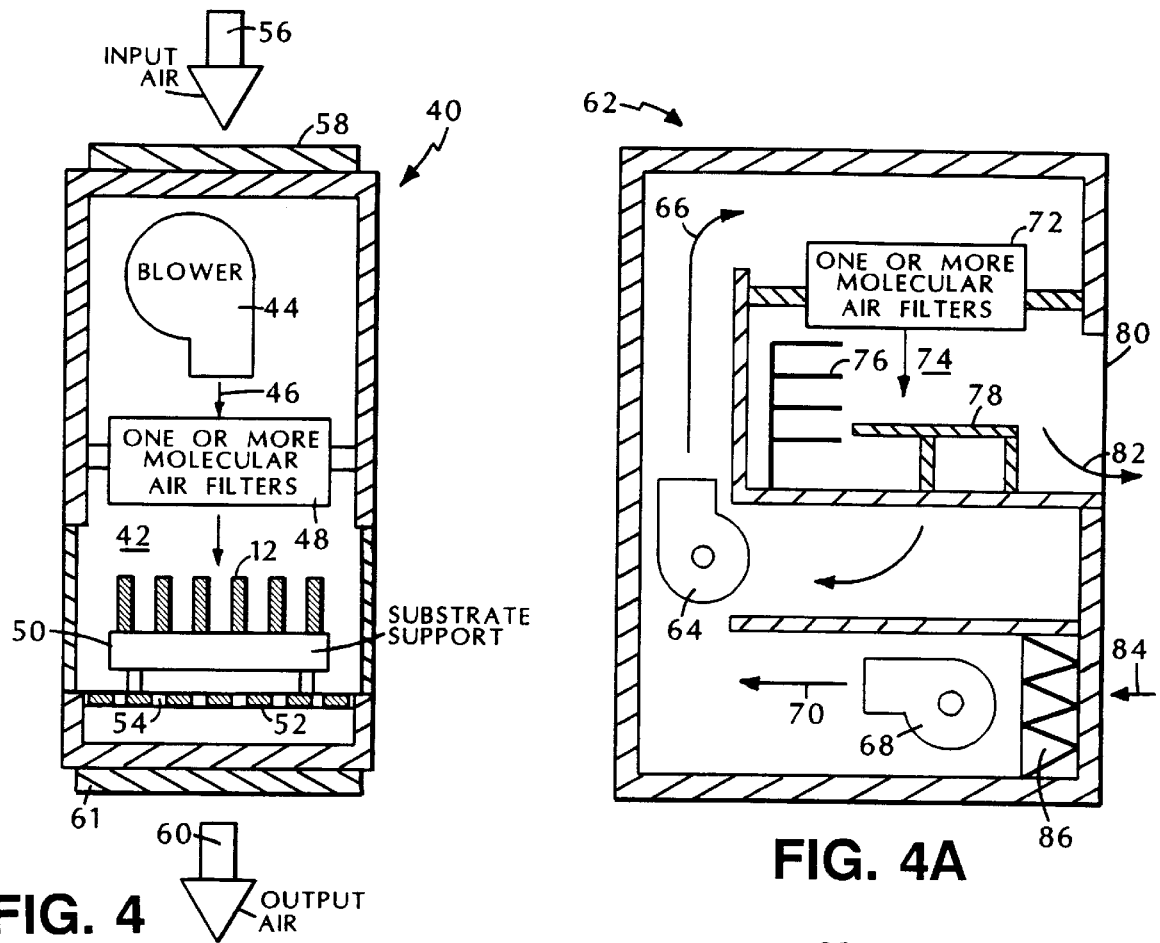
FIG. 4
FIG. 4A
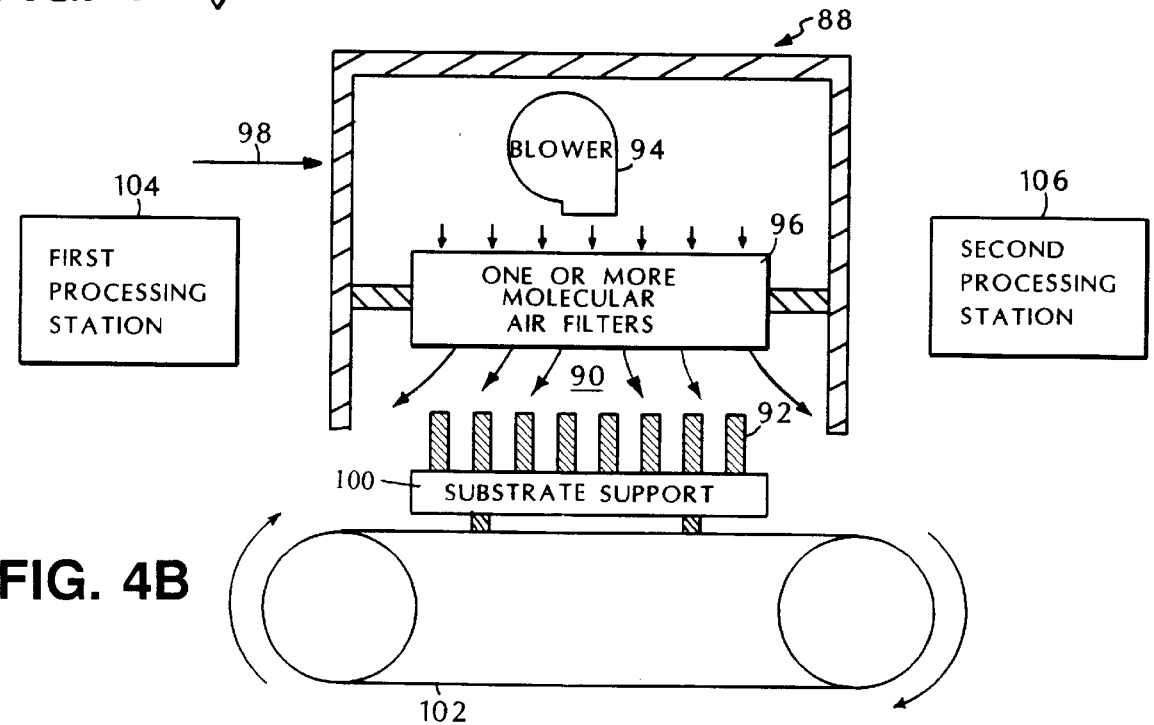
FIG. 4B

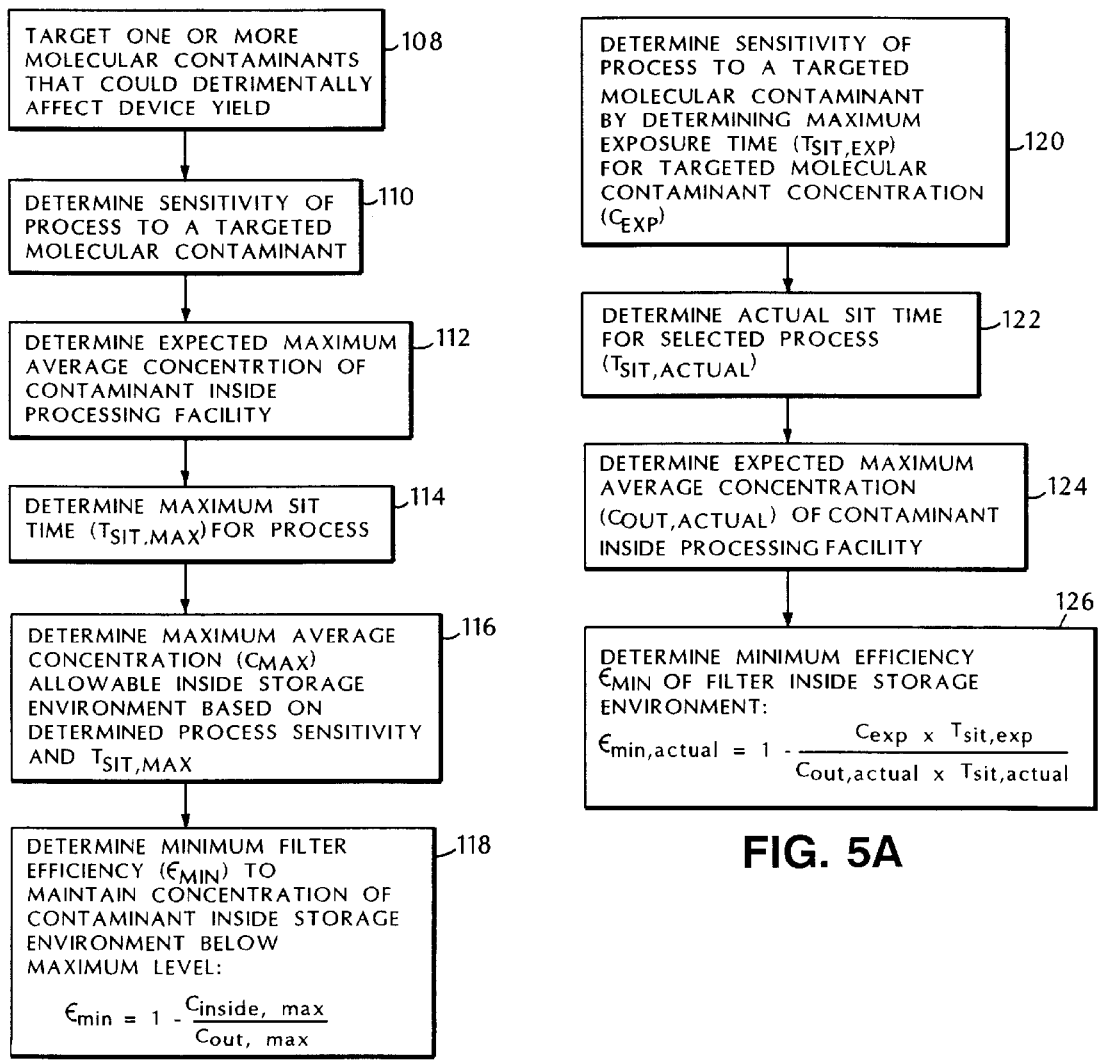

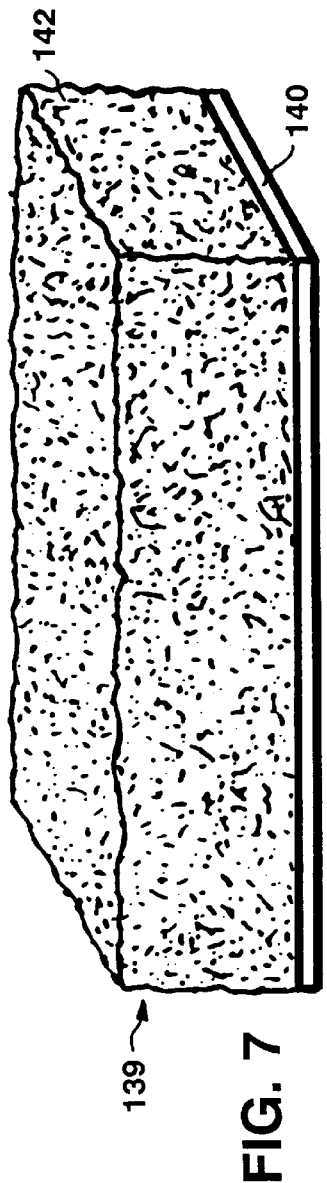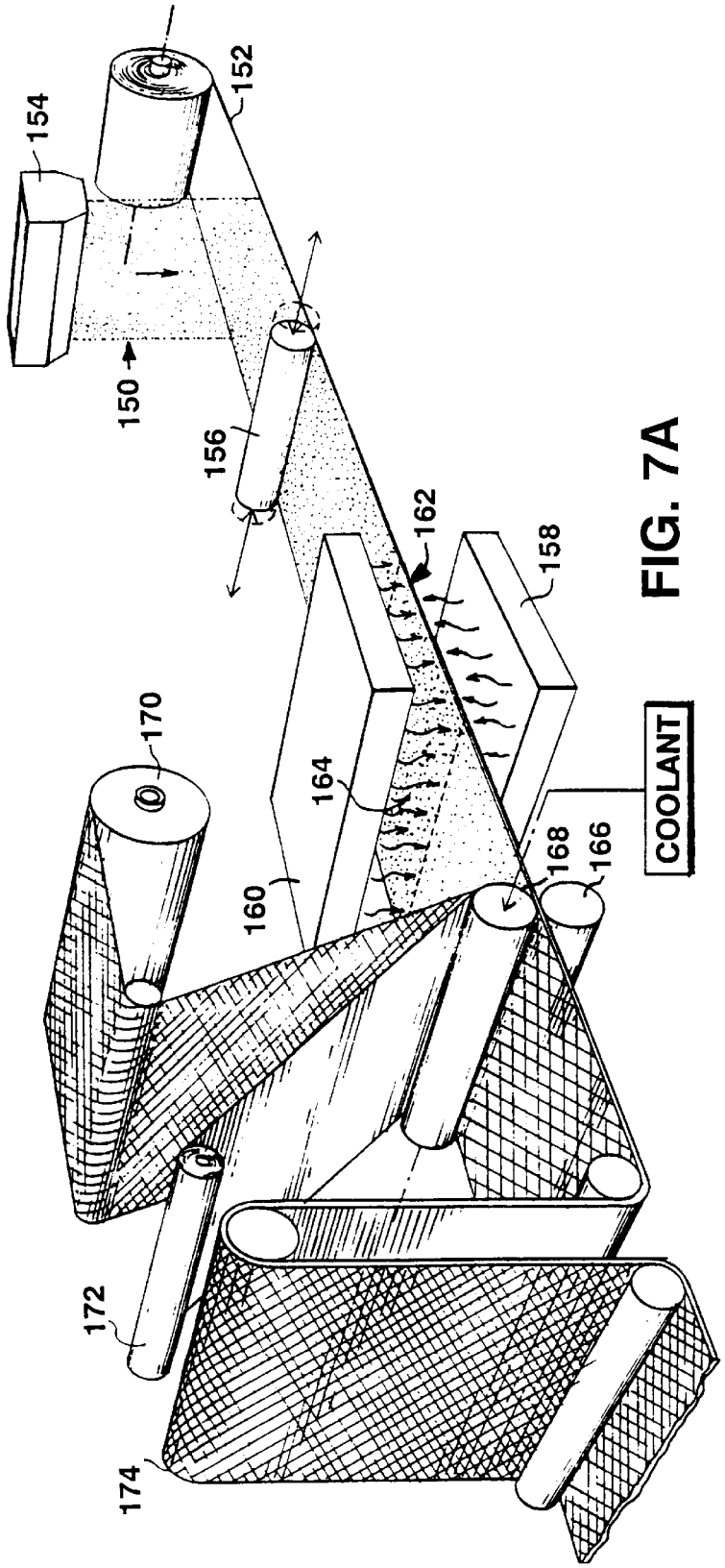
FIG. 7A
FIG. 7

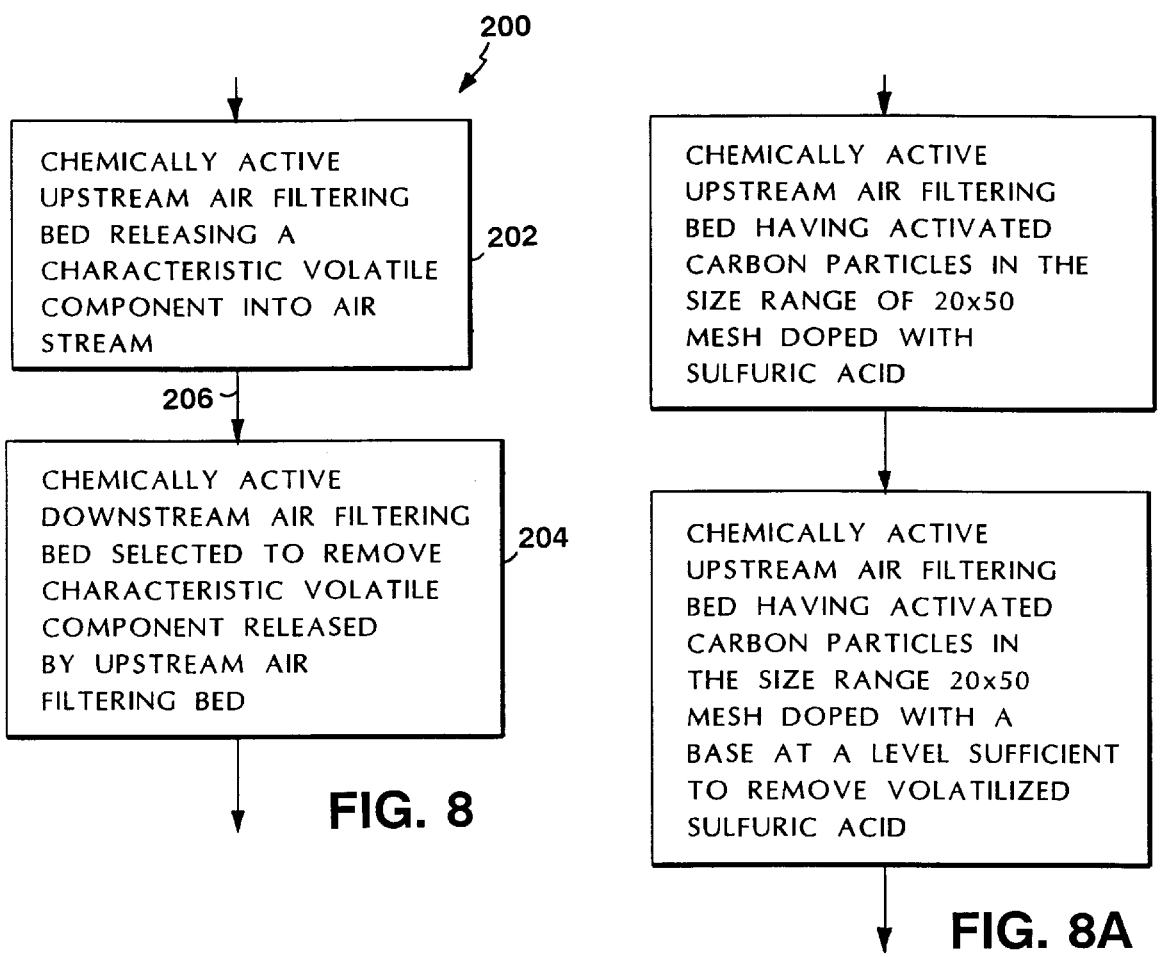

5,833,726

STORING SUBSTRATES BETWEEN PROCESS STEPS WITHIN A PROCESSING FACILITY

BACKGROUND OF THE INVENTION

This invention relates to storing substrates between process steps within a processing facility.

Many processing facilities (environments) need to remain clean to achieve practical yields and acceptable product performance; such environments include semiconductor device fabrication environments (cleanrooms), museums, archives, petrochemical plants, refineries, waste-water treatment facilities, airport terminals, office buildings in urban areas, and hospitals. Tremendous efforts are made to eliminate process-limiting contaminants from such manufacturing sites. Contaminants are generally classified as either particulate or molecular contaminants. Common particulate contaminants include dust, lint and other debris. Examples of process-limiting molecular contaminants include: acids, such as, hydrochloric acid, nitric acid, phosphoric acid, hydrobromic acid; bases, such as, ammonia, ammonium hydroxide, tetramethylammonium hydroxide, trimethylamine, triethylamine, hexamethyldisilazane, NMP, cyclohexylamine, diethylaminoethanol, methylamine, dimethylamine, ethanolamine, morpholine; condensables, such as, silicones and hydrocarbons with a boiling point greater than or equal to 150° C.; and dopants, such as, boron (usually as boric acid), phosphorus (usually as organophosphate), and arsenic (usually as arsenates).

Most design efforts of processing facilities concern the removal of particulate contaminants from the constituent airstreams; this is because particulate contaminants were viewed as having the most impact on product yield and performance. Recently, e.g., in semiconductor cleanroom design, it has been realized that molecular contamination can impose severe limitations on further reduction of device geometry and improvement of device performance. See, e.g., the following co-pending applications, which are assigned to the present assignee and which are herein incorporated by reference: U.S. Pat. Nos. 5,626,820; 5,462,485; 5,582,865; and 5,607,647.

SUMMARY OF THE INVENTION

While some processing facilities have achieved acceptable levels of cleanliness, improved process yields and product performance are still possible. The inventors have realized that, despite the fact that such processing facilities are substantially free of airborne particulate contamination and usually have low levels of gas-phase molecular contamination, substrates stored before, between, and after such processing steps may accumulate over time adsorbed airborne molecular contamination at levels that may detrimentally affect process yield and product performance.

In one aspect, the invention features a system for defining, inside a processing facility, a storage environment that is substantially free of a targeted molecular contaminant and in which one or more substrates are to be stored for a period of time before or after a substrate processing step; the system comprising: an air blower for providing a flow of air within a storage environment defined inside a processing facility; a substrate support for holding one or more substrates within the storage environment; and a molecular air filter having an input face positioned to receive air from the blower and having an output face for providing a flow of filtered air inside the storage environment, the molecular air filter being constructed and arranged to remove an airborne molecular contaminant from air flowing into the storage environment to achieve a concentration level of the molecular contaminant inside the storage environment suitable for storing one or more substrates therein for a sit time corresponding to the time before a subsequent substrate processing step; wherein the storage environment is substantially free of the targeted airborne molecular contaminant.

Embodiments may include one or more of the following features. The molecular air filter is preferably constructed and arranged to remove a targeted gas-phase molecular contaminant that is detrimental to a subsequent processing step. The molecular air filter is also preferably constructed and arranged to remove the targeted airborne molecular contaminant with an efficiency selected based on the sensitivity of the subsequent processing step to the airborne molecular contaminant, the expected substrate storage time, and the expected concentration level of the targeted airborne molecular contaminant in air outside of the storage environment.

In some preferred embodiments, the molecular air filter is selected so that the targeted airborne molecular contaminant is removed from the storage environment with an efficiency ($\epsilon$) given by:

$$\epsilon = 1 - \frac{C_{storage,max}}{C_{process,max}}$$

wherein $C_{storage,max}$ is the maximum average concentration of the targeted molecular contaminants inside the storage environment and $C_{process,max}$ is an expected maximum average concentrated of the targeted molecular contaminant inside the processing facility.

Also, in some preferred embodiments, the molecular air filter is selected so that the targeted airborne molecular contaminant is removed from the storage environment with an efficiency ($\epsilon$) given by:

$$\epsilon = 1 - \frac{C_{exp} \times T_{sit,exp}}{C_{out,actual} \times T_{sit,actual}}$$

wherein $T_{sit,max}$ is the maximum time a substrate to be processed is expected to be exposed to the targeted molecular contaminant at a concentration of $C_{exp}$ before fabrication yield is affected, $C_{out,actual}$ is an expected maximum average concentration of the targeted molecular contaminant inside the processing facility, and $T_{sit,actual}$ is the expected actual sit time.

The blower preferably provides a flow of air within the storage environment with an average flow rate, and the molecular air filter is constructed and arranged to remove the airborne molecular contaminant with an efficiency selected based on the average flow rate of air provided by the blower. One or more additional molecular air filters may be positioned in series with the first molecular air filter to increase the efficiency at which the targeted molecular contaminant is removed from the storage environment. In some of these embodiments, at least two molecular air filters are constructed and arranged to respectively remove different airborne molecular contaminants from the storage environment.

In some preferred embodiments, the molecular air filter comprises activated carbon impregnated with a reagent selected to remove the targeted airborne molecular contaminant from air flowing therepast. A housing is preferably provided for containing the substrate support and within which the storage environment is defined. The blower preferably provides a flow of air within the housing so that the housing is under positive pressure with respect to adjacent areas outside of the housing. In some embodiments, the air blower, the molecular air filter, and the substrate support are portable about the processing facility as a unit. Means (e.g., an automated robot arm, or a conveyor belt having a surface constructed and arranged for bearing one or substrates through the storage environment) are preferably provided for moving one or substrates into and out of the storage environment. In some embodiments, the substrate support is positioned to hold one or more substrates in the flow of filtered air from the molecular air filter in the storage environment.

In another aspect, the invention features a semiconductor wafer storage system for defining, within a semiconductor cleanroom, a storage environment that is substantially free of a targeted gas-phase molecular contaminant and in which one or more semiconductor wafers are to be stored for a period of time before or after a semiconductor device processing step. The system comprising: an air blower for providing a flow of air inside the storage environment; a substrate support for holding one or more semiconductor wafers within the storage environment; and a molecular air filter having an input face positioned to receive air from the blower and having an output face for providing a flow of filtered air inside the storage environment, the molecular air filter being constructed and arranged to remove an airborne molecular contaminant from air flowing into the storage environment to achieve a concentration level of the molecular contaminant inside the storage environment suitable for storing one or more substrates therein for a sit time corresponding to the time before a subsequent semiconductor device processing step; wherein the storage environment is substantially free of the targeted airborne molecular contaminant.

Embodiments may include one or more of the following features.

When the subsequent semiconductor device processing step is a gate oxidation processing step, the molecular air filter is preferably constructed and arranged to remove airborne dopants from the storage environment. The molecular air filter is preferably constructed and arranged to maintain the concentration of airborne dopants inside the wafer storage environment below 250 ppt molar, preferably below 100 ppt molar, and more preferably below 1 ppt molar, and still more preferably below 0.1 ppt molar. The molecular air filter preferably comprises activated carbon particles impregnated with a basic reagent. The activated carbon particles are preferably in the size range of 6×140, and more preferably 10×30 U.S. mesh.

When the subsequent semiconductor device processing step is a salicidation (self-aligned silicides) processing step, the molecular air filter is preferably constructed and arranged to remove airborne acids from the storage environment. The molecular air filter is preferably constructed and arranged to maintain the concentration of airborne acids inside the wafer storage environment below 5 ppb molar, preferably below 1 ppb molar, and more preferably below 0.2 ppb molar. The molecular air filter preferably comprises activated carbon particles impregnated with a basic reagent. The activated carbon particles are preferably in the size range of 6×140, and more preferably 10×30 U.S. mesh.

When the subsequent semiconductor device processing step is a contact formation processing step, the molecular air filter is preferably constructed and arranged to remove airborne acids from the storage environment. The molecular air filter is preferably constructed and arranged to maintain the concentration of airborne acids inside the wafer storage environment below 5 ppb molar, preferably below 0.5 ppb molar, and more preferably below 0.01 ppb molar. The molecular air filter preferably comprises activated carbon particles impregnated with a basic reagent. The activated carbon particles are in the size range of 6×140, and more preferably 10×30 U.S. mesh.

When the subsequent semiconductor device processing step is a photolithography processing step, the molecular air filter is preferably constructed and arranged to remove airborne bases from the storage environment. The molecular air filter is preferably constructed and arranged to maintain the concentration of airborne bases inside the wafer storage environment below 15 ppb molar, preferably below 5 ppb molar, and more preferably below 1 ppb molar. The molecular air filter preferably comprises activated carbon particles impregnated with an acidic reagent. The molecular air filter preferably comprises activated carbon particles impregnated with oxalic acid. The activated carbon particles are preferably in the size range of 6×140, and more preferably 10×30 U.S. mesh. In some preferred embodiments, the molecular air filter comprises: an upstream air filtering bed positioned to receive the air stream from the processing facility and comprising an upstream chemically active reagent (e.g., sulfuric acid or oxalic acid) selected to effectively remove the process-limiting molecular contaminant from the air stream as the air stream passes through the upstream air filtering bed, the upstream chemically active reagent releasing a characteristic volatile component into the air stream in sufficient quantity to be detrimental to the processing facility; and a downstream air filtering bed positioned to receive the air stream that has passed through the upstream air filtering bed and comprising a downstream reagent (e.g., a base) selected to remove the characteristic volatile component released by the upstream reagent into the air stream.

In another aspect, the invention features a method for defining, within a processing facility, a storage environment that is substantially free of a targeted gas-phase molecular contaminant, in which one or more substrates are to be stored for a period of time before or after a substrate processing step. The method comprising the steps of: receiving one or more substrates from a previous processing step; supporting the one or more substrates in a storage environment on a support before a subsequent processing step; providing, in the storage environment, a flow of air in the vicinity of the one or more substrates; and removing an airborne molecular contaminant from the provided air to achieve a concentration level of the molecular contaminant inside the storage environment suitable for storing one or more substrates therein for a sit time corresponding to the time before the subsequent processing step; wherein the storage environment is substantially free of the airborne molecular contaminant.

Embodiments may include one or more of the following features. When the subsequent processing step is a semiconductor device gate oxidation processing step, the removing step preferably comprises maintaining the concentration of airborne dopants in air inside the storage environment below one part per trillion molar. When the subsequent processing step is a semiconductor device salicidation processing step, the removing step preferably comprises maintaining the concentration of airborne acids inside the storage environment below one part per billion molar. When the subsequent processing step is a semiconductor device contact formation processing step, the removing step preferably comprises maintaining the concentration of airborne acids inside the storage environment below one part per billion molar. When the subsequent processing step is a semiconductor device photolithography processing step, the removing step preferably comprises maintaining the concentration level of airborne acids inside the storage environment below one part per trillion molar.

The received substrates may be one or more semiconductor wafer substrates or one or more biological sample substrates.

The inventors believe that, if substrates are stored in storage environments according to the invention before, between, and after processing steps, accumulation of detrimental airborne molecular contamination on substrate surfaces can be controlled to levels below which product yield and performance are detrimentally affected. The invention also addresses the need to protect substrates from exposure to elevated levels of process-limiting airborne molecular contamination that occur as a result of internal (e.g., spills) or external (e.g., elevated levels of outdoor airborne contamination which is drawn into the processing facility) events.

Other features and advantages will become apparent from the following description and from the claims.

BRIEF DESCRIPTION OF THE DRAWINGS

FIGS. 4, 4A and 4B are diagrammatic side views of different systems for defining, inside a processing facility, respective storage environments in which one or more substrates are to be stored.

FIGS. 5 and 5A are flow diagrams of methods for determining minimal levels of air filtering efficiency.

FIGS. 7, 7A and 7B are perspective views of a fabric-based air filter fabrication process.

FIGS. 8 and 8A are diagrammatic side views of molecular air filters having sequential air filtering beds.

DESCRIPTION OF THE PREFERRED EMBODIMENTS

Figure 1:
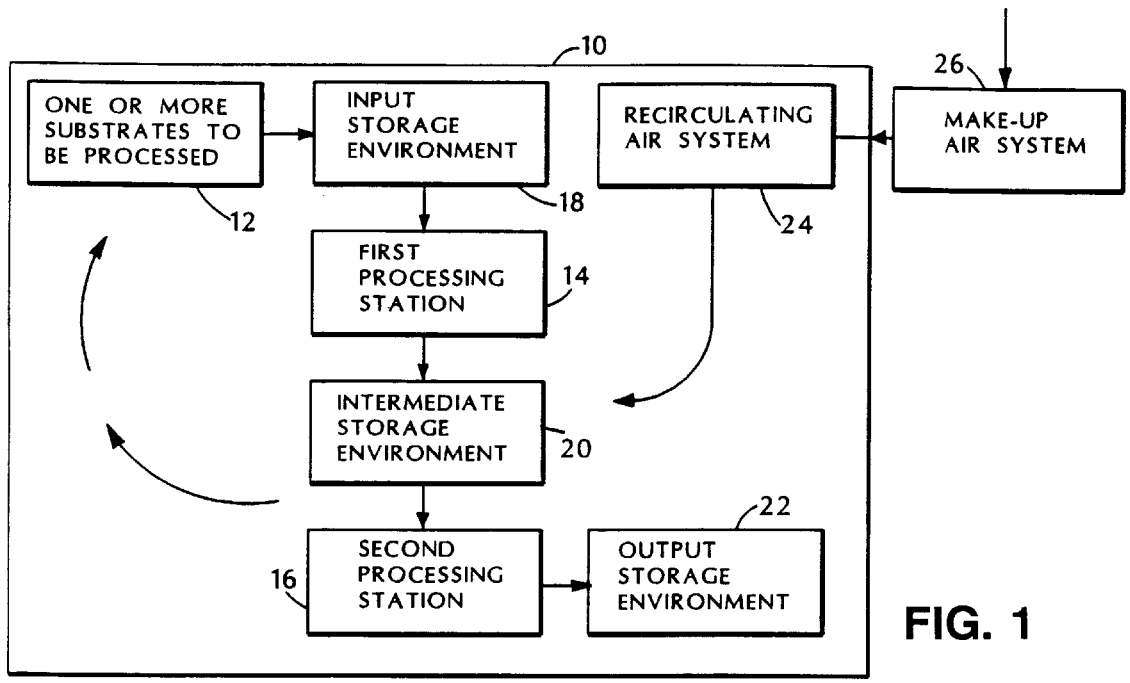
FIG. 1 is a schematic diagram of a processing facility containing first and second processing stations for conducting first and second processing steps, respectively, and input, intermediate, and output storage environments in which one or more substrates are to be stored before, between, and after the first and second processing steps, respectively.

Referring to FIG. 1, a processing facility 10 for processing one or more substrates 12 (e.g., a cleanroom for manufacturing semiconductor devices, or a pharmaceutical manufacturing site for processing biological sample substrates) includes first and second processing stations 14 and 16, and input, intermediate, and output storage environments 18, 20, and 22, respectively. Storage environments 18, 20, and 22 are positioned before, between, and after the first and second processing stations, respectively, and are used to store the one or more substrates before a subsequent processing step or after a preceding processing step. In a presently preferred embodiment, processing facility 10 includes a recirculating air system 24 and a make-up air system 26, which include respective particulate (e.g., a high efficiency particulate air (HEPA)) and molecular air filters for maintaining low levels of airborne particulate and molecular contamination inside the processing facility.

In practice, substrates must frequently be stored before, between, or after a processing step, e.g., to take advantage of batch processing for some processing steps, while accommodating serial throughput for other processing steps. The inventors have realized that, despite the fact that such processing facilities usually have low levels of contamination, substrates stored before, between, and after such processing steps may accumulate over time adsorbed airborne molecular contamination at levels that may detrimentally affect process yields and product performance.

Figures 2, 2A:
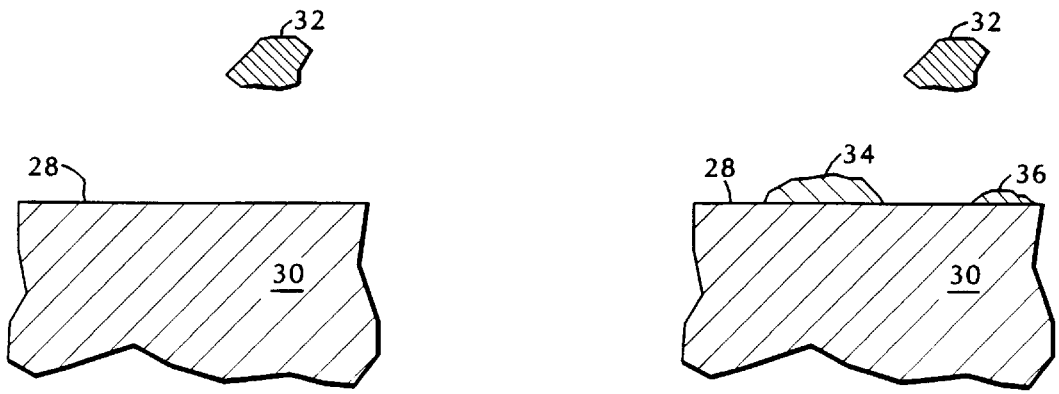
FIG. 2 is a diagrammatic cross-sectional side view of a substrate exposed to air containing airborne molecular contamination.
FIG. 2A is a diagrammatic cross-sectional side view of the substrate of FIG. 2, shown after the substrate has been exposed to contaminated air for a period of time.

As shown in FIG. 2, a surface 28 of a substrate 30 inside a processing facility is initially free of adsorbed molecular contamination; however, before, between, and after a processing step (i.e., during process delay), the substrate surface is exposed to air containing airborne molecular contamination 32. Over time, molecular contamination 34, 36 may be adsorbed onto the surface of the substrate, as shown in FIG. 2A. As the surface concentration of the adsorbed molecular contamination increases, so does the potential for such accumulated contamination to detrimentally affect product yield and performance, especially as product (e.g., semiconductor device) dimensions become smaller.

Airborne molecular contaminants are deposited onto the surface of a substrate at an average areal deposition rate D (molecules per second per cm$^2$) given by:

$$D = S \times C \times \frac{v_{th}}{4} \quad (1)$$

where S is a sticking coefficient having a value between 0 and 1, C is the concentration of the molecular contaminant to which the substrate is exposed (molecules per cm$^3$), and $v_{th}$ is the average thermal velocity of the molecular contaminant (cm per second). To avoid a process-limiting condition, the surface concentration ($N_s$) of the molecular contaminant should be below a maximum value ($N_{max}$) which depends on the sensitivity of a given process and the exposure time. That is:

$$D \times T_{sit} \leq N_{max} \quad (2)$$

where $T_{sit}$ is the period of time (sit time) the wafers are exposed to the molecular contaminant before the next processing step.

Figure 2B:
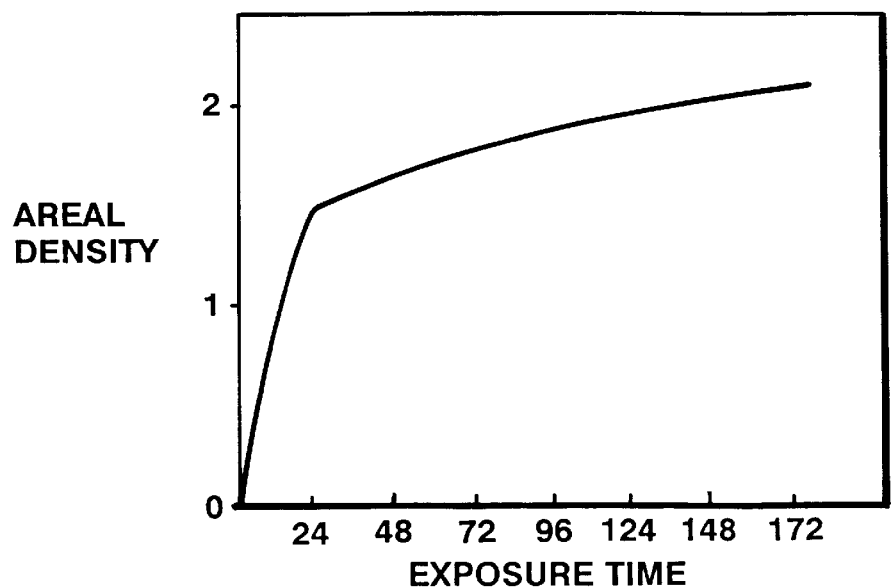
FIG. 2B is the accumulated areal density of boron contamination adsorbed onto a semiconductor wafer surface plotted as a function of exposure time.

Referring to FIG. 2B, the inventors have learned that airborne molecular contamination accumulates at a higher rate on a clean surface than on a contaminated surface. FIG. 2B shows the accumulated areal density of boron contamination adsorbed onto a semiconductor wafer surface plotted as a function of exposure time during a test in which the wafer was exposed to a somewhat fixed concentration of airborne molecular boron contamination. As shown, the areal density of accumulated boron contamination increases at a relatively high rate for the first twenty-four hours and considerably slows down thereafter.

Figure 3:
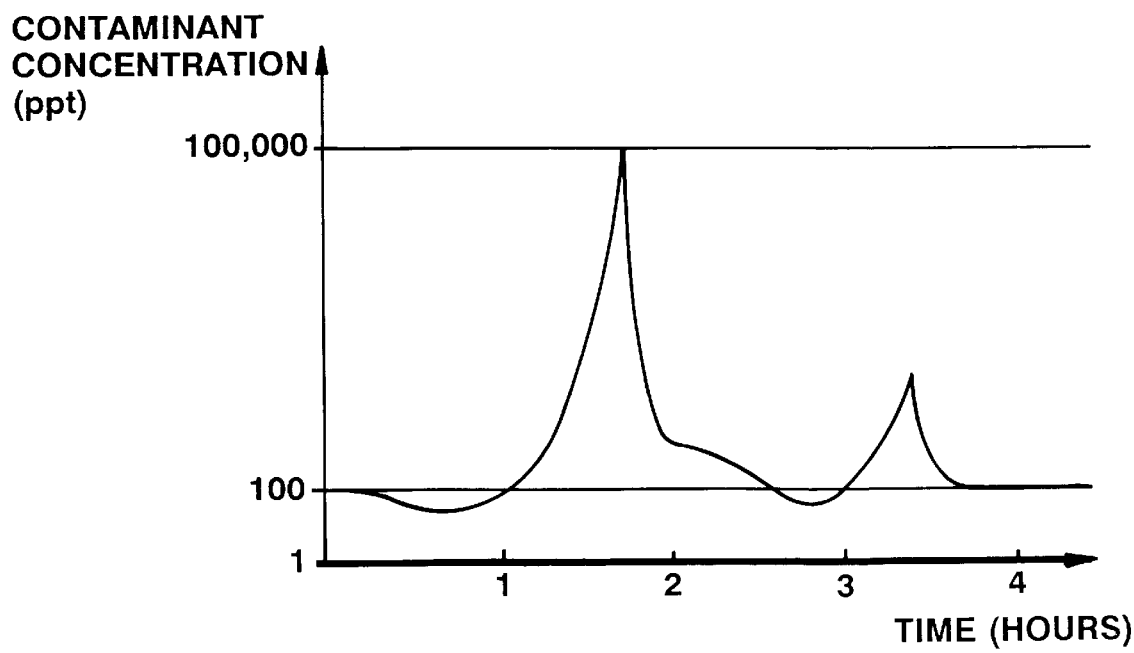
FIG. 3 is a diagrammatic representation of the concentration of a hypothetical contaminant inside a processing facility plotted as a function of time.

Referring to FIG. 3, the inventors have realized that the concentrations of airborne molecular contaminants inside a processing facility (e.g., a semiconductor cleanroom) are not static. Instead, the concentration of a particular contaminant may increase by one or more orders of magnitude over a relatively short period of time, in some instances on the order of one hour or less (these increases appear as large "spikes" in FIG. 3). These increased concentration levels may be caused by internal events, such as, spills inside the processing facility (acids, bases, solvents) or external events, such as, elevated airborne molecular contaminant levels introduced into the air outside of the processing facility, from which the processing facility draws in make-up air (e.g., organophosphate contamination arising from fertilizers deposited from airplanes over farming communities).

The amount of molecular contamination adsorbed onto the substrate surface can be reduced by shortening the time (delay) between processing steps (sit time). Reduction in process delay, however, decreases process latitude and does not provide the flexibility needed to accommodate situations in which unforeseen process delay occurs, such as, system malfunction. The inventors believe that, if substrates are, instead, stored in prescribed storage environments (e.g., 18, 20, and 22; FIG. 1) before, between, and after processing steps, accumulation of detrimental airborne molecular contamination on substrate surfaces can be controlled to levels below which product yield and performance are detrimentally affected.

Referring to FIG. 4, a presently preferred once-through (without air recirculation) storage system 40 includes: an air blower 44 for providing a flow of air 46 through storage environment 42; one or more molecular air filters 48 which are constructed and arranged to remove a selected airborne molecular contaminant from air flowing into storage environment 42 to maintain the concentration of a targeted molecular contaminant low enough to safely store one or more substrates 12 for a period of time before the subsequent substrate processing step; and a substrate support 50 for holding the one or more substrates in the flow of filtered air 52 from molecular air filter 48. Substrate support 50 is supported by a floor 52 which has a plurality of perforations 54 that allow air to pass through. Input air 56 is drawn into system 40 by blower 44 through a molecular air prefilter 58, and output air 60 flows through the perforations in floor 52 and subsequently out of system 40 through outlet 61.

Referring to FIG. 4A, in another embodiment, a storage system 62 includes a recirculating air blower 64 for providing a recirculating air flow 66 and a make-up air blower 68 for providing a make-up air flow 70. Recirculating air flow 66 passes through one or more molecular air filters 72 mounted between blower 64 and a storage environment 74, in which one or more substrates 76 are stored before, between, and after processing steps. Substrates 76 are loaded into and out of the storage environment by an automated robot arm 78 through a door 80. Storage environment 74 is preferably maintained under positive pressure with respect to the outside atmosphere; in some storage environment air 82 escapes out of the storage environment past door 80. Make-up air blower 68 draws air 84 into system 62 from the processing facility through a molecular air prefilter 86.

Referring to FIG. 4B, in another embodiment, a storage system 88, in which one or more substrates 92 are to be stored before, between, and after processing steps, includes a blower 94 and one or more molecular air filters 96. Air 98 is drawn in from the processing facility and directed through the one or more molecular filters and into a storage environment 90, which is maintained under positive pressure with respect to the clean room atmosphere. Substrates 92 are held in a support 100, which is mounted on a conveyor belt 102. In use, the substrates and support are moved from a first processing station 104 to a second processing station 106 over the conveyor belt; the conveyor belt positions the substrates under storage environment 90 between processing steps (during process delay) so that the substrates are not detrimentally affected by ambient molecular contamination inside the processing facility.

Air Handling System

In the design of the recirculating and make-up air handling systems of the above-described substrate storage systems, it is desirable to achieve the lowest practical level of airborne molecular contamination. A compromise must be reached, however, between the level of contamination and the cost of the system. To achieve a lower level of air contamination the number of air filters in the system can be increased. But this adds to the cost of the processing facility in at least two ways. First, additional filters increase pressure drop in the associated air handling system (reducing the volume of air flowing through filtering system per unit time) and larger air blowers are needed to make up the loss in pressure. Second, the increase in the size of the blowers and the additional space taken up by the additional filters require a larger and, therefore, more expensive processing facility to house the substrate storage systems.

Thus, it is desirable to optimize the air filtration system associated with the storage systems by targeting the removal of the contaminants that significantly affect process yield and product performance. The one or more molecular air filters used in the above-described storage substrate systems are selected based on the sensitivity of a given process to a selected molecular contaminant and the maximum sit time expected before the stored substrates will be processed. In a presently preferred embodiment, each storage system accommodates an associated processing station inside the processing facility by maintaining the concentration of a targeted class or species of molecular contamination below levels detrimental to process yields or product performance.

Referring to FIG. 5, in one preferred embodiment, the minimum removal efficiency of the air substrate storage air handling system for a selected gas-phase molecular contaminant is determined according to the following steps. One or more molecular contaminants that are present within the processing facility at concentration levels that could detrimentally impact fabrication yields of a given process are targeted (108). The sensitivity of the process to the one or more targeted molecular contaminants is determined (110). The maximum expected average concentration ($C_{OUT, MAX}$) of the one or more targeted contaminants inside the processing facility is determined (112). The maximum expected sit time ($T_{SIT,MAX}$) for the process is determined The maximum average concentration ($C_{INSIDE,MAX}$) of the targeted molecular contaminant that is allowable inside the clean storage zone is determined based on the determined process sensitivity and $T_{SIT,MAX}$ (116). The minimum filter efficiency ($\epsilon_{MIN}$) needed to maintain the concentration of the selected molecular contaminant inside the storage environment below $C_{IN,MAX}$ is then determined from (118):

$$\epsilon_{min} = 1 - \frac{C_{inside,max}}{C_{out,max}} \qquad (3)$$

Referring to FIG. 5A, in one exemplary embodiment, the sensitivity of the process to a targeted molecular contaminant is determined by determining the maximum time ($T_{SIT, EXP}$) a substrate to be processed is expected to be exposed to the targeted molecular contaminant concentration ($C_{EXP}$) before fabrication yield is affected (120). The expected actual sit time ($T_{SIT,ACTUAL}$), corresponding to the time the one or more substrates will be stored in the storage environment before processing, is determined (122). The expected maximum average concentration ($C_{OUT,ACTUAL}$) of the molecular contaminant inside the processing facility is determined (124). The minimum removal efficiency ($\epsilon_{MIN}$) of the one or more molecular air filters is then determined from (126):

$$\epsilon_{min} = 1 - \frac{C_{exp} \times T_{sit,exp}}{C_{out,actual} \times T_{sit,actual}} \quad (4)$$

The air filters used to define the storage environments are designed to selectively remove the one or more targeted airborne molecular classes or species present in the processing facility and to which a given process has been determined to be particularly sensitive. The number of filters used in the storage environment areas depends on the minimal efficiency desired and the removal efficiency of the selected filters. As shown in Table 1, below, the removal efficiency of an air filter system increases logarithmically with the number of serially arranged filters.

TABLE 1

| Single Pass Removal Efficiency of Each Filter | Number of Filters in Series | In-Series Removal Efficiency |
| --- | --- | --- |
| 85% | 1 | 85.000000% |
| 85% | 2 | 97.750000% |
| 85% | 3 | 99.662500% |
| 85% | 4 | 99.949375% |
| 85% | 5 | 99.992406% |
| 85% | 6 | 99.998861% |

Air Flow Rate

Air flow rates through the storage environments are in the range of about 200–1,000 air exchanges per hour (about 5–120 linear feet per minute).

As discussed above, to avoid a process limiting condition, the following relationship must hold:

$$D \times T_{sit} \leq N_{max} \quad (5)$$

where D is the deposition rate, $T_{sit}$ is the sit time, and $N_{max}$ is the maximum allowable surface concentration of the targeted contaminant accumulated on the substrate before process yield and product performance are significantly affected. For a constant contaminant generation rate outside of the substrate storage environment (G), and assuming a once-through filtration system, the concentration of the targeted contaminant outside the storage environment for a time period n ($C_{out}(n)$) is given by:

$$C_{out}(n) = (1-\epsilon)C_{out}(n-1) + G\Delta t \quad (6)$$

where $\Delta t$ is the time it takes to exchange the air in the storage environment, which is inversely proportional to the flow rate (F). Accordingly, $$\begin{aligned} c_{out}(\infty) &= G\Delta t/\epsilon \quad (7) \\ &= G/\epsilon F \end{aligned}$$

where $\epsilon$ is the removal efficiency of the filter system of the storage environment. It follows that:

$$c_{in}(\infty) = \frac{1-\epsilon}{\epsilon} \cdot \frac{G}{F} \quad (8)$$

Since $D = \gamma C_{in}(n)$, we obtain the following relationship:

$$\left(\frac{1-\epsilon}{\epsilon}\right) \times \left(\frac{1}{F}\right) \leq \frac{N_{max}}{T_{sit} \times G} \quad (9)$$

Therefore, the flow rate (F) and the efficiency ($\epsilon$) of the filter system may be selected based on $N_{max}$, $T_{exp}$, and $G_{max}$, which may be experimentally obtainable for a given process and process environment.

Based on a linear regression model, the inventors have determined that the design parameters should be selected in the following prioritized order: (1) $N_{max}$ should be determined; (2) the filtration system should have a high removal efficiency ($\epsilon$) for the targeted contaminant; (3) the exposure time ($T_{sit}$) should be minimized; (4) a reasonably high flow rate (F) should be maintained within the clean storage environment; and lastly, (5) the generation rate (G) of the targeted contaminant should be minimized.

Filter Embodiments

Figure 6:
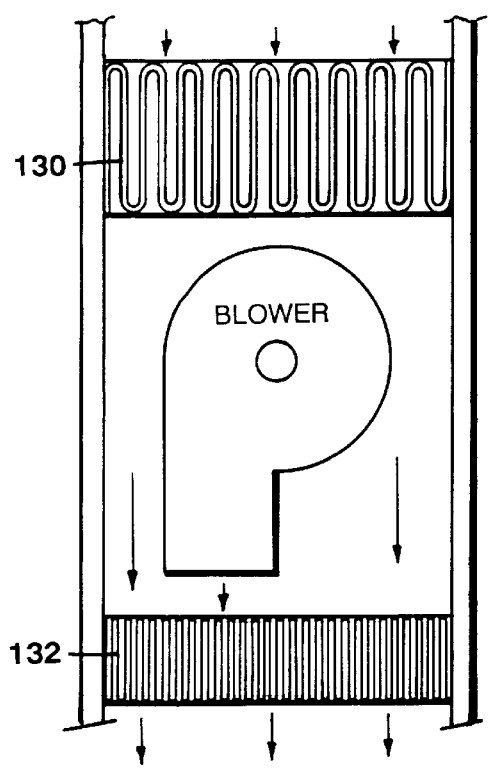
FIGS. 6 and 6A are diagrammatic side views of air handling systems for use with the substrate storage environments shown in FIGS. 4–4B.

Referring to FIG. 6, a pleated fabric-based air filter 130 containing chemically-impregnated activated carbon particles is located directly upstream of a HEPA filter 132 (i.e., there is no intervening filter between the HEPA filter and the air filter that would cause additional pressure drop to the air stream) inside the recirculating air systems of a storage environment area. Air filter 130 has typical dimensions of 24 inches by 24 inches in face area by 12 inches in depth.

Figure 6A:
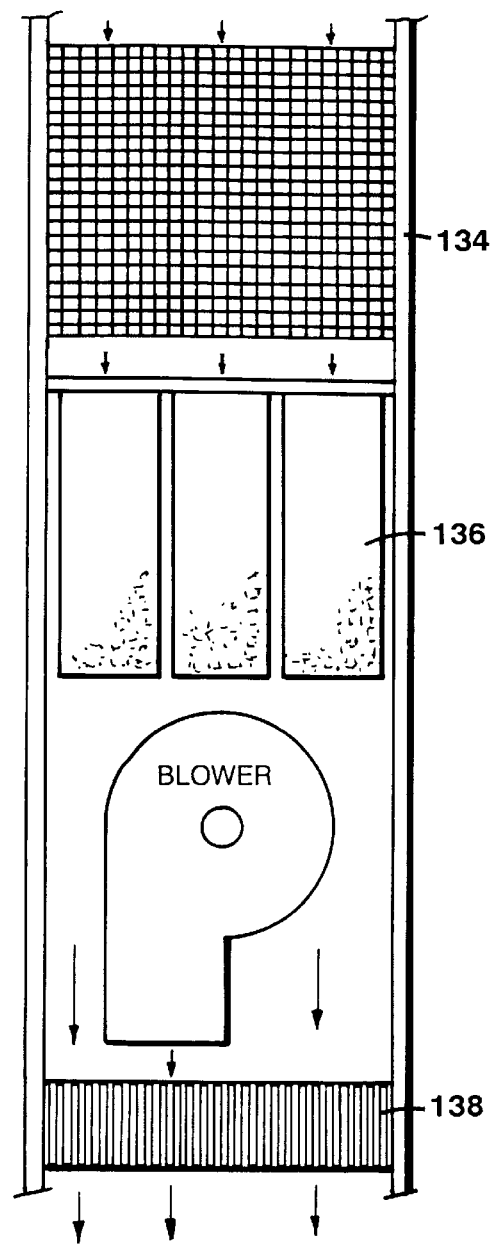

As shown in FIG. 6A, in another embodiment, chemically-impregnated activated carbon particles are contained within a rack and tray filter 134 which is formed from an air permeable perforated metal container having typical dimensions of 24 inches by 24 inches in face area by 29 inches in depth. A particle filter 136 (e.g., a bag filter) is located downstream of rack and tray filter 134 to capture released particulate matter and prevent rapid loading of HEPA filter 138, which is expensive and difficult to replace. In one rack-and-tray air filter embodiment, the chemically-impregnated activated carbon particles are in the size range of 4×8 U.S. mesh size.

Selection of Adsorbent Surfaces

The adsorbent surfaces selected for chemical impregnation are preferably in the form of porous adsorbent material, such as, activated carbon particles or carbon fibers (woven or non-woven), zeolite, and silica gel; although, other adsorbent surface structure may be useful.

Adsorption-based filters operate on the principles of diffusion and the diffusion gradient. Diffusion delivers the molecular contaminant to the surface of the adsorbent particles and provides the mechanism by which the contaminant penetrates the exterior surface of the adsorbent material. Diffusion in the airstream is a passive process whereby an area of high contaminant concentration moves to an area of relatively lower concentration on the adsorbent surface. The diffusion gradient is the concentration difference between a region of higher concentration (in the airstream or on the adsorbent surface) and a region of lower concentration (on the adsorbent surface). The larger the diffusion gradient, the faster the movement process occurs. At low concentrations (less than 10 ppm), the diffusion gradient is low and diffusion into the adsorbent material occurs at a rate much lower than the rate at which the filter loses efficiency (i.e., its ability to adsorb contaminants).

We have realized, therefore, that when designing molecular air filtration systems for low concentration environments it is important to have a large surface area of adsorbent material exposed to the constituent air streams. This is accomplished, e.g., by using very small adsorbent particles that have a very high surface area to mass ratio. This is especially important in chemisorptive systems in which molecular contaminants react to form solids at the surface of the adsorbent particles. Solids are less mobile and do not migrate appreciably into the particle, even under high contaminant concentrations. Increasing the available adsorbent surface area by using small adsorbent particles provides a higher performing system at a lower cost. Preferred sizes for activated carbon particles for use in a processing facility are in the range of 4×8 for rack-and-tray filters and 20×140, more preferably 20×70, and still more preferably 30×40 U.S. mesh size for fabric-based filters.

Fabric-Based Filter Embodiment

Figure 7B:
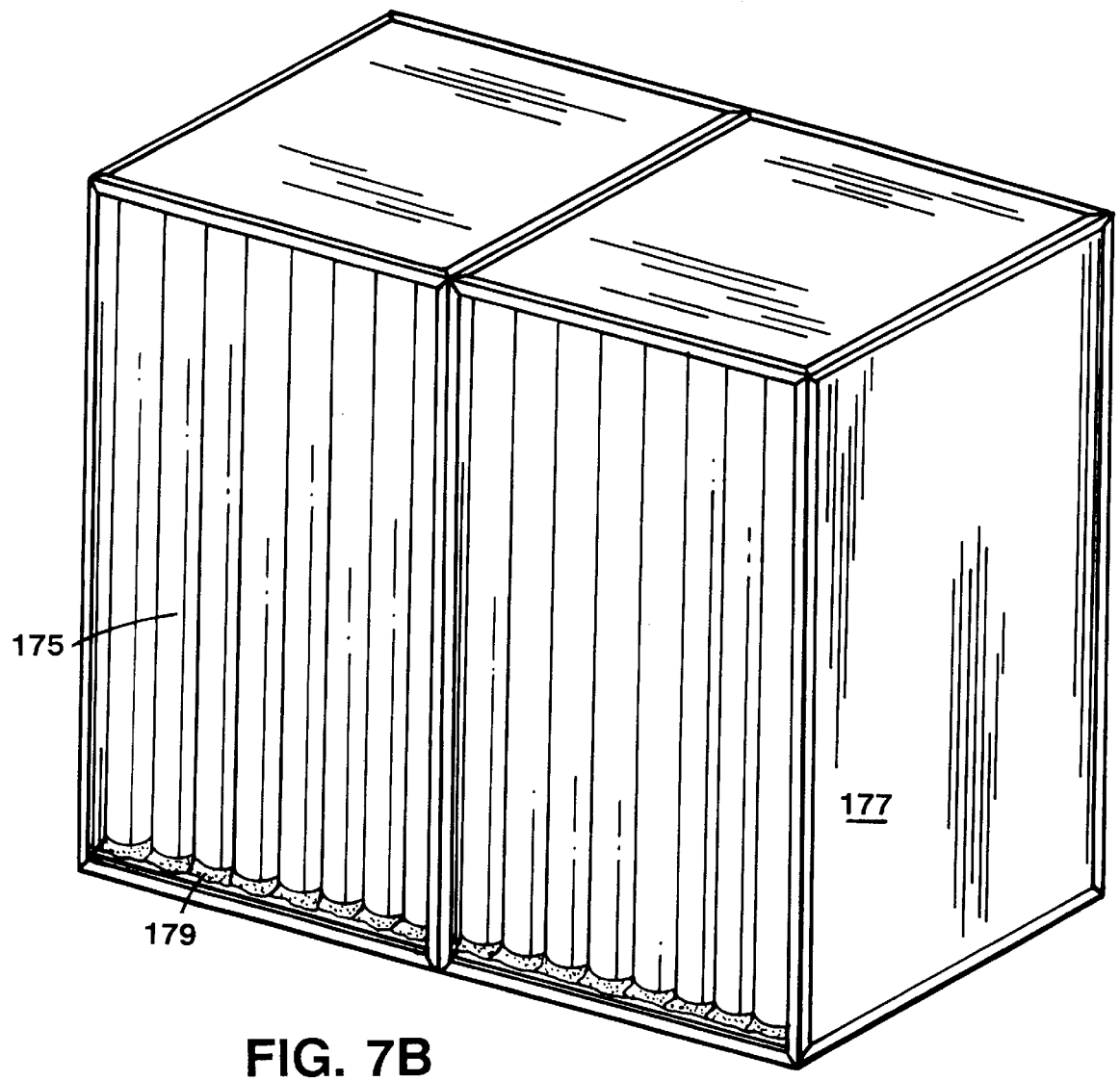

Referring generally to FIGS. 7–7B, in a presently preferred fabric-based air filter embodiment, (VAPORSORB®, manufactured by Extraction Systems, Inc., the assignee of the present invention) an air permeable support structure 139 is formed from a dense, needled, non-woven polyester batting 140 (or some other thermo-plastic material) of about fifteen denier and having a thickness of about ¼ inch (FIG. 7). The batting is spray-bonded to a loose non-woven polyester batting 142 of approximately six denier and having a thickness of approximately 1 inch. After bonding, the resulting carrier material has two distinct layers and a thickness of approximately 0.8 inch. In an alternative embodiment, the non-woven carrier is formed from a polyester batting that is needled on one side, forming a single polyester batting having a dense layer on one side and a total thickness of about 0.8 inch. Chemically impregnated adsorbent particles are applied to the carrier material from a vibrating support that evenly distributes the particles in the polyester batting. The resulting particle-loaded carrier material is heated and calendered under controlled conditions. The dry processing of the non-woven polyester batting, which includes the combination of the fluidized bed particle deposition process, the inherent stratification of the batting's density, and the even distribution of the adsorbent particles as well as the stratification of the adsorbent particle size, allows for a fabric architecture having an increased bed depth at a very low pressure drop, which is highly desirable due to its high first pass efficiency coupled with its low operating cost.

As shown in FIG. 7A, chemically-impregnated adsorbent particles 150 are poured onto a polyester batting 152 from a fluidized bed 154, the batting 152 is agitated using a roll bar 156 that agitates the batting in a direction perpendicular to the length of the batting. This agitation insures that the adsorbent particles 150 are distributed in the depth of the batting 152. The agitation causes the smaller particles to migrate furthest from the batting surface while the larger particles remain nearer the surface thereby providing a stratification of the adsorbent particles in the depth of the polyester batting. An increased bed depth of adsorbent particles increases residence time, increases exposure of the adsorbent particle surfaces, provides a low pressure drop, and increases the lifetime of the filter.

Batting 152, with adsorbent particles 150 distributed therein, is then exposed to two zones 158, 160 of radiant infrared energy at different respective temperatures. In a first zone 158, the heating energy is set to a relatively high temperature (e.g., about 550° F.) and is directed toward the dense non-woven backing 162. In the second zone 160, the heating energy is set to a relatively low temperature (e.g., about 325° F.) and is directed to the loose non-woven surface 164. The adsorbent particles are heated to an overall average temperature of about 250°–350° F.

The infrared energy is not substantially absorbed by the fibers of the batting, and is instead, preferentially absorbed by the adsorbent particles, which act as black-body absorbers. This causes the adsorbent particles to adhere to the batting at points where the particles contact the batting. This procedure avoids the necessity of raising the temperature of the entire batting to a point at, or near, the melting point of the polyester batting, which could cause the batting to melt and collapse thereby encasing the particles and destroying their chemical activity.

Batting 152 is then calendered using a pair of calender rolls 166, 168. The first of these rolls 166 can be temperature-controlled which allows the heating and calendering steps to be carried out at a steady temperature of around 110°–115° F., and prevents overheating and subsequent melting of a cover sheet 172 that may be provided over the backing layer 162, and prevents over-calendering of the batting. When the temperature-controlled roller 166 is used, the pressure at which the batting is calendered can be lowered from 3000–5000 psi to about 1000–1500 psi, and preferably 1000 psi across a twenty-six inch long roller (about 38 psi per inch of roller), as a result of the steady temperature maintained during calendering. Higher calendering pressures would crush the adsorbent particles, forming dust that cannot be retained in the filter composite. Therefore, the ability to use lower pressures in the calendering step is very desirable in preventing the destruction of the carbon particles contained in the batting, and formation of carbon dust. A non-woven cover sheet 172 helps to maintain the carbon in the batting is preferably calendered with the batting 152. The material is also preferably conducted over an upper roller 174 to facilitate cooling the carrier material before the filter is processed further. The composite is preferably pleated. The pleated structure is placed in a containment structure such that the crease of the fold is perpendicular to the air flow. A wire mesh 170 is preferably calendered with the batting to help maintain the pleated shape of the filter material. The presence of wire mesh 170 in the filter material also enables the filter material to be embossed before pleating.

Referring to FIG. 7B, in one embodiment, the pleated filter structure 175 is framed within a formaldehyde-free prelaminate-coated hardboard (e.g., Masonite™) casing 177 with dimensions of 24 inches by 12 inches in face area by 12 inches in depth. The materials chosen for the construction of casing 177 are chosen to have a low vapor pressure so that the casing does not contribute gas-phase contamination to the clean room. The filter is potted inside the casing so that the higher density fibers are downstream the lower density fibers. In this configuration, any larger carbon particles that may become unbound from the lower density fibers will be caught by the downstream higher density fibers. The ends of the pleated structure are potted into the casing with a foamed polyamide hot-melt adhesive film 179. The polyamide adhesive and the formaldehyde-free casing are selected because they do not off-gas into the clean room after they have been installed. The two end flaps, which would normally be loose in conventional pleated structures, are also sealed using the same polyamide adhesive. The filter and frame form a single disposable filter unit.

For further details regarding the construction of such fabric-based molecular air filters refer to co-pending application Ser. No. 08/161,931, filed Dec. 2, 1993, which is herein incorporated by reference.

Applications

The inventors have realized that some processing steps are more sensitive to some classes or species of airborne molecular contamination than to other classes or species and that the yield-affecting concentration levels of these molecular contaminants varies over a relatively wide range (e.g., parts per million (ppm) to parts per trillion (ppt)). The inventors have compiled and utilized this information for the design of practical substrate storage environments that are substantially free of one or more targeted gas-phase molecular contaminants, in which one or more substrates are to be stored for a period of time before, between, and after substrate processing steps.

In the following examples, the inventors have determined the sensitivity of four semiconductor device fabrication processes (gate oxidation, salicidation, contact formation, and deep UV photolithography) to four classes of gas-phase molecular contamination classes (acids, bases, condensables, and dopants). The values presented below assume semiconductor device dimensions of 0.25 µm; the sensitivity of these processes are expected to increase as device dimensions are reduced.

EXAMPLE 1

The inventors have determined rough estimates of the sensitivity of the gate oxidation process step performed in a semiconductor device fabrication facility (cleanroom) to the above-mentioned classes of airborne molecular contamination, assuming a maximum sit time of four hours. The results are presented in Table 2, below.

TABLE 2

| Pre-gate oxidation contamination limits. | | | |
|---|---|---|---|
| Acids | Bases | Condensables | Dopants |
| 13 ppb molar | 13 ppb molar | 1 ppb molar | 0.1 ppt molar |

Concentrations of 0.5–100 ppb for acids (e.g., HCl, $H_2SO_4$, $H_3PO_4$, HF, $HNO_3$, and HBr) and bases (e.g., ammonia and NMP) are typical for semiconductor cleanrooms, concentrations of 1–200 ppb molar for condensables and 5–50 ppt molar for dopants (e.g., boron and organophophates) are also typical. Undesirable gate capacitance-voltage characteristics have been observed in devices formed from substrates exposed to organophosphate concentrations of 5–50 ppt molar for about one hour before gate oxidation.

In a presently preferred embodiment, a storage environment for storing semiconductor wafers between the preoxidation clean process step and the gate oxidation process step in a semiconductor device fabrication facility has one or more molecular air filters which are selected to maintain the concentration of airborne dopants (e.g., boron and phosphorus) in the storage environment below 250 ppt molar, preferably below 100 ppt molar, and more preferably below 1 ppt molar, and still more preferably below 0.1 ppt molar; this reduces wafer doping prior to gate oxidation, which would otherwise detrimentally affect process yield. In one embodiment, the air flow is once-through, while in another embodiment, a portion of the air within the storage environment is recirculated. One or more molecular filters include activated carbon particles doped with one or more reagents selected from KOH, KI, $Na_2CO_3$, $K_2CO_3$, $CaCO_3$, NaOH, and other basic reagents used to remove gaseous forms of organophosphorus and boron (e.g., in the form of $BF_3$ or $B(OH)_3$).

EXAMPLE 2

The inventors have determined rough estimates of the sensitivity of a salicidation process step performed in a semiconductor device fabrication facility (cleanroom) to the above-mentioned classes of airborne molecular contamination, assuming a maximum sit time of one hour. The results are presented in Table 3, below.

TABLE 3

| Salicidation contamination limits. | | | |
|---|---|---|---|
| Acids | Bases | Condensables | Dopants |
| 0.18 ppb molar | 13 ppb molar | 35 ppb molar | 1 ppb molar |

Concentrations of 0.5–100 ppb for acids (e.g., HCl, $H_2SO_4$, $H_3PO_4$, HF, $HNO_3$, and HBr) and bases (e.g., ammonia and NMP) are typical for semiconductor cleanrooms, concentrations of 1–200 ppb molar for condensables and 5–50 ppt molar for dopants (e.g., boron and organophophates) are also typical.

In a presently preferred embodiment, a storage environment for storing semiconductor wafers before the salicidation process step in a semiconductor device fabrication facility has one or more molecular air filters which are selected to maintain the concentration of airborne acids (e.g., HCl, $H_2SO_4$, $H_3PO_4$, HF, $HNO_3$, and HBr) in the storage environment below 5 ppb molar, preferably below 1 ppb molar, and more preferably below 0.2 ppb molar; this reduces the effects of anion contamination on the electrical characteristics of fabricated devices (e.g., contact resistance would increase due to the corrosive effects of such anions and device reliability would suffer as a result of such corrosion). In one embodiment, the air flow is once-through, while in another embodiment, a portion of the air within the storage environment is recirculated. One or more molecular filters include activated carbon particles doped with one or more reagents selected from KOH, KI, $Na_2CO_3$, $K_2CO_3$, $CaCO_3$, NaOH, and other basic reagents used to remove gaseous forms of organophosphorus and boron (e.g., in the form of $BF_3$ or $B(OH)_3$).

EXAMPLE 3

The inventors have determined rough estimates of the sensitivity of the contact formation process step performed in a semiconductor device fabrication facility (cleanroom) to the above-mentioned classes of airborne molecular contamination, assuming a maximum sit time of twenty-four hours. The results are presented in Table 4, below.

TABLE 4

| Contact formation contamination limits. | | | |
|---|---|---|---|
| Acids | Bases | Condensables | Dopants |
| 5 ppt molar | 13 ppb molar | 2 ppb molar | 0.1 ppm molar |

Concentrations of 0.5–100 ppb for acids (e.g., HCl, $H_2SO_4$, $H_3PO_4$, HF, $HNO_3$, and HBr) and bases (e.g., ammonia and NMP) are typical for semiconductor cleanrooms, concentrations of 1–200 ppb molar for condensables and 5–50 ppt molar for dopants (e.g., boron and organophophates) are also typical.

In a presently preferred embodiment, a storage environment for storing semiconductor wafers before the contact formation process step in a semiconductor device fabrication facility has one or more molecular air filters which are selected to maintain the concentration of airborne acids (e.g., HCl, $H_2SO_4$, $H_3PO_4$, HF, $HNO_3$, and HBr) in the storage environment below 5 ppb molar, preferably below 0.5 ppb molar, and more preferably below 0.01 ppb molar; this reduces the effects of anion contamination on the electrical characteristics of fabricated devices (e.g., contact resistance would increase due to the corrosive effects of such anions and device reliability would suffer as a result of such corrosion). In one embodiment, the air flow is once-through, while in another embodiment, a portion of the air within the storage environment is recirculated. One or more molecular filters include activated carbon particles doped with one or more reagents selected from KOH, KI, $Na_2CO_3$, $K_2CO_3$, and other basic reagents used to remove gaseous forms of organophosphorus and boron (e.g., in the form of $BF_3$ or $B(OH)_3$).

EXAMPLE 4

The inventors have determined rough estimates of the sensitivity of a photolithography (e.g., deep ultra-violet (UV) or x-ray photolithography) process step performed in a semiconductor device fabrication facility (cleanroom) to the above-mentioned classes of airborne molecular contamination, assuming a maximum sit time of two hours. The results are presented in Table 5, below.

TABLE 5

Deep UV photolithography contamination limits.

| Acids | Bases | Condensables | Dopants |
|---|---|---|---|
| 10 ppb molar | 1 ppb molar | 100 ppb molar | 10 ppb molar |

Concentrations of 0.5–100 ppb for acids (e.g., HCl, $H_2SO_4$, $H_3PO_4$, HF, $HNO_3$, and HBr) and bases (e.g., ammonia and NMP) are typical for semiconductor cleanrooms, concentrations of 1–200 ppb molar for condensables and 5–50 ppt molar for dopants (e.g., boron and organophophates) are also typical. Unless airborne dopants and condensables are also bases, they are not expected to cause process problems for photolithography at the concentrations and sit times expected for a typical cleanroom.

In a presently preferred embodiment, a storage environment for storing semiconductor wafers before the photolithography process step in a semiconductor device fabrication facility has one or more molecular air filters selected to maintain the concentration of airborne bases (e.g., ammonia and NMP) in the storage environment below 15 ppb molar, preferably below 5 ppb, and more preferably below 1 ppb molar, to prevent the effects of anion contamination on the electrical characteristics of the fabricated device (e.g., contact resistance would increase due to the corrosive effects of such anions and device reliability would suffer as a result of such corrosion). In one embodiment, the air flow is once-through, while in another embodiment, a portion of the air within the storage environment is recirculated. One or more molecular filters include activated carbon particles doped with one or more reagents selected from oxalic acid, sulfuric acid, and other acid reagents to remove airborne basic molecular contamination.

In those embodiments which include oxalic acid, the impregnated adsorbent particles are preferably impregnated with oxalic acid at a doping level of 5% to 50% by weight, and preferably with a doping level of about 25%. Some reagents used to remove ammonia contain metals (e.g., zinc, which changes the electrical properties of semiconductor device) or phosphorus (an electrical dopant for silicon), which are known to degrade semiconductor fabrication processes. Oxalic acid ($C_2H_2O_4$), on the other hand, contains only carbon, hydrogen, and oxygen and, thus, does not by itself produce contamination detrimental to clean room processes (e.g., deep UV photolithography). We have found that filters that include oxalic acid-impregnated activated carbon particles effectively remove ammonia and other proton-accepting molecular contamination from processing facilities, enabling reduction of wafer hazing and preventing degradation of chemically amplified photoresist, without generating process-degrading contamination. We have discovered that oxalic acid is readily incorporated into adsorbent surface structure (e.g., porous material, such as, activated carbon particles and fibers, zeolite, and silica gel) to provide effective removal of ammonia and other proton-accepting molecular contamination from air under clean room conditions (e.g., an average temperature of 68°–70° F. and an average relative humidity of 40–60%), without generating molecular contamination that is detrimental to clean room processes (e.g., deep UV photolithography). We have further discovered that the ammonia removal efficiency of oxalic acid-impregnated activated carbon particles is not detrimentally degraded during the fabrication of a preferred fabric-based support structure, described in detail Other embodiments are within the scope of the claims.

For example, in some embodiments, the storage environment-defining systems shown in FIGS. 4–4B are constructed to be portable about the processing facility. Some embodiments are mounted on a wheeled support, while other embodiments are mounted from the ceiling on conveyor tracks.

Referring to FIG. 8, a chemically active air filtering system 200, which is used in some preferred substrate storage systems, is formed from separate sequentially arranged upstream and downstream air filtering beds 202, 204. The air filtering beds may be rack and tray-type filters or they may be fabric-based filters, as described in detail above.

Upstream air filtering bed 202 is positioned to receive air streams 206 within the processing facility and includes an upstream reagent selected to effectively remove molecular contamination from the air streams as the air streams pass therethrough. The upstream reagent is selected based on its effectiveness for targeted removal of process-limiting molecular contamination and is not limited to those reagents that do not contribute contamination to the air streams. In fact, many effective reagents useful for targeted removal of molecular contamination tend to release volatile components (e.g., vapors resulting from volatilization of the reagent itself or volatile by-products resulting from the reaction between the reagent and a molecular contaminant) into air streams under normal operating conditions (e.g., temperatures between 68° F. and 70° F. and relative humidity of about 40%). The upstream air filtering bed typically includes adsorbent particles (e.g., activated carbon particles) that are impregnated with a reagent, which may release volatile components into the air streams in sufficient quantity to be detrimental to the clean room before, during or after airstreams containing molecular contamination pass through the upstream bed. Downstream air filtering bed 204 is positioned to receive air streams 208 that have passed through the upstream air filtering bed and include a downstream reagent selected to remove the airborne components generated by the upstream reagent and released into the air streams. The doping level of the downstream reagent is selected to be sufficient to reduce the concentration level of the volatile component released by the upstream air filtering bed to a level that is not detrimental to an associated process within the processing facility. This level can be empirically determined. This design allows for the use of higher performing reagents that would otherwise be unusable due to their volatility or some other chemical, physical, or reactive property that would contribute contamination to the clean room (e.g., the generation of unstable and volatile reaction by-products).

Referring to FIG. 8A, in a particularly important embodiment useful for filtering air streams associated with deep ultraviolet photolithography stations, the upstream chemically active air filtering bed includes activated carbon particles in the size range of 20×50 mesh doped with sulfuric acid. The downstream chemically active air filtering bed includes activated carbon particles in the size range of 20×50 mesh dopes with a base, such as KOH or KI, at a doping level sufficient to remove from air streams flowing therethrough volatilized sulfuric acid released by the upstream air filtering bed. In a presently preferred embodiment, for the effective targeted removal of ammonia and other reactive amines from the vicinity of a deep UV photolithography station, molecular air filters having upstream and downstream air filtering beds are installed in the air handling system of a storage associated with a photolithography station. The upstream air filtering bed includes activated carbon particles in the size range of 6×140 mesh, and preferably 10×30 mesh, impregnated with sulfuric acid at a doping level of 5–90%, and more preferably between 20% and 50%. The sulfuric acid reacts with amine contamination ($R(NH_4)$) to produce a solid by-product at the surface of the activated carbon particles:

$$R(NH_4) + H_2SO_4 \rightarrow (NH_4)_2(SO_4) \text{ (solid)}$$

The downstream air filtering bed includes activated carbon particles in the size range of 6×140 mesh, more preferably between 10×30 mesh, impregnated with a downstream reagent selected to remove acid-based contamination, e.g., a base, such as potassium hydroxide at a doping level of 5–15%, or a chemical from the following group: KI, $K_2CO_3$, NaOH, and $Na_2CO_3$.

Still other embodiments are within the scope of the claims.

What is claimed is:

1. A system for defining, inside a processing facility, a storage environment that is substantially free of a targeted molecular contaminant and in which one or more substrates are to be stored for a period of time before or after a substrate processing step, the system comprising
    an air blower for providing a flow of air from the processing facility to the storage environment defined inside the processing facility,
    a substrate support for holding one or more substrates inside the storage environment, and
    a molecular air filter having an input face positioned to receive air from the blower and having an output face for providing a flow of filtered air to the storage environment, the molecular air filter being chemically treated to selectively remove a targeted molecular contaminant having a significant detrimental affect upon the substrate processing step relative to other molecular contaminants contained in the air provided from the processing facility, the molecular air filter having a removal efficiency for the targeted molecular contaminant selected based upon the sensitivity of the substrate processing step to the targeted molecular contaminant, the expected concentration level of the targeted molecular contaminant in the air provided from the processing facility and the expected substrate storage sit time inside the storage environment, wherein the concentration of the molecular contaminant inside the storage environment is reduced to a level suitable for storing one or more substrates inside the storage environment for the duration of the expected substrate storage sit time without detrimentally affecting the substrate processing step.

2. The system of claim 1 wherein the molecular air filter is constructed and arranged to remove a targeted gas-phase molecular contaminant that is detrimental to a subsequent processing step.

3. The system of claim 1 wherein the molecular air filter is selected so that the targeted airborne molecular contaminant is removed from the storage environment with an efficiency ($\epsilon$) given by:

$$\epsilon = 1 - \frac{C_{storage,max}}{C_{process,max}}$$

wherein $C_{storage,max}$ is the maximum average concentration of the targeted molecular contaminant allowable inside the storage environment and $C_{process,max}$ is an expected maximum average concentration of the targeted molecular contaminant inside the processing facility.

4. The system of claim 1 wherein the molecular air filter is selected so that the targeted airborne molecular contaminant is removed from the storage environment with an efficiency ($\epsilon$) given by:

$$\epsilon = 1 - \frac{C_{exp} \times T_{sit,exp}}{C_{out,actual} \times T_{sit,actual}}$$

wherein $T_{sit,max}$ is the maximum time a substrate to be processed is expected to be exposed to the targeted molecular contaminant at a concentration of $C_{exp}$ before fabrication yield is affected, $C_{out,actual}$ is an expected maximum average concentration of the targeted molecular contaminant inside the processing facility, and $T_{sit,actual}$ is the expected actual sit time.

5. The system of claim 1 wherein the blower provides a flow of air within the storage environment with an average flow rate, and the molecular air filter is constructed and arranged to remove the airborne molecular contaminant with an efficiency selected based on the average flow rate of air provided by the blower.

6. The system of claim 1 further comprising one or more additional molecular air filters which are positioned in series with the first molecular air filter and are constructed and arranged to increase the efficiency at which the targeted molecular contaminant is removed from the storage environment.

7. The system of claim 6 wherein at least two molecular air filters are constructed and arranged to respectively remove different airborne molecular contaminants from the storage environment.

8. The system of claim 1 wherein the molecular air filter comprises activated carbon impregnated with a reagent selected to remove the targeted airborne molecular contaminant from air flowing therepast.

9. The system of claim 1 further comprising a housing for containing the substrate support and within which the storage environment is defined.

10. The system of claim 9 wherein the blower provides a flow of air within the housing so that the housing is under positive pressure with respect to adjacent areas outside of the housing.

11. The system of claim 1 wherein the air blower, the molecular air filter, and the substrate support are portable about the processing facility as EL unit.

12. The system of claim 1 further comprising means for moving one or substrates into and out of the storage environment.

13. The system of claim 12 wherein the substrate moving means comprises an automated robot arm.

14. The system of claim 12 wherein the substrate moving means comprises a conveyor belt having a surface constructed and arranged for bearing one or substrates through the storage environment.

15. The system of claim 1 wherein the substrate support is positioned to hold one or more substrates in the flow of filtered air from the molecular air filter in the storage environment.

16. A system for defining, within a semiconductor cleanroom, a storage environment that is substantially free of a targeted molecular contaminant and in which one or more semiconductor wafers are to be stored for a period of time before or after a semiconductor device processing step, the system comprising
    an air blower for providing a flow of air from the processing facility to the storage environment,
    a substrate support for holding one or more semiconductor wafers inside the storage environment, and
    a molecular air filter having an input face positioned to receive air from the blower and having an output face for providing a flow of filtered air to the storage environment, the molecular air filter being chemically treated to selectively remove a targeted molecular contaminant having a significant detrimental affect upon the semiconductor device processing step relative to other molecular contaminants contained in the air provided from the semiconductor cleanroom, the molecular air filter having a removal efficiency for the targeted molecular contaminant selected based upon the sensitivity of the semiconductor device processing step to the targeted molecular contaminant, the expected concentration level of the targeted molecular contaminant in the air provided from the semiconductor cleanroom and the expected substrate storage sit time inside the storage environment, wherein the concentration of the molecular contaminant inside the storage environment is reduced to a level suitable for storing one or more substrates inside the storage environment for the duration of the expected substrate storage sit time without detrimentally affecting the semiconductor device processing step.

17. The semiconductor wafer storage system of claim 16 wherein the semiconductor device processing step is a gate oxidation processing step and the molecular air filter is constructed and arranged to remove airborne dopants from the air provided from the semiconductor cleanroom to the storage environment targeted.

18. The semiconductor wafer storage system of claim 17 wherein the molecular air filter is constructed and arranged to maintain the concentration of airborne dopants inside the wafer storage environment below 250 ppt molar.

19. The semiconductor wafer storage system of claim 17 wherein the molecular air filter is constructed and arranged to maintain the concentration of airborne dopants inside the wafer storage environment below 1 ppt molar.

20. The semiconductor wafer storage system of claim 17 wherein the molecular air filter comprises activated carbon particles impregnated with a basic reagent.

21. The semiconductor wafer storage environment of claim 20 wherein the activated carbon particles are in the size range of 6×140 U.S. mesh.

22. The semiconductor wafer storage system of claim 16 wherein the semiconductor device processing step is a salicidation processing step and the molecular air filter is constructed and arranged to remove airborne acids from the air provided from the semiconductor cleanroom to the storage environment targeted.

23. The semiconductor wafer storage system of claim 22 wherein the molecular air filter is constructed and arranged to maintain the concentration of airborne acids inside the wafer storage environment below 5 ppb molar.

24. The semiconductor wafer storage system of claim 22 wherein the molecular air filter is constructed and arranged to maintain the concentration of airborne acids inside the wafer storage environment below 1 ppb molar.

25. The semiconductor wafer storage system of claim 22 wherein the molecular air filter comprises activated carbon particles impregnated with a basic reagent.

26. The semiconductor wafer storage system of claim 25 wherein activated carbon particles are in the size range of 6×140 U.S. mesh.

27. The semiconductor wafer storage system of claim 16 wherein the semiconductor device processing step is a contact formation processing step and the molecular air filter is constructed and arranged to remove airborne acids from the air provided from the semiconductor cleanroom to the storage environment targeted.

28. The semiconductor wafer storage system of claim 27 wherein the molecular air filter is constructed and arranged to maintain the concentration of airborne acids inside the wafer storage environment below 5 ppb molar.

29. The semiconductor wafer storage system of claim 27 wherein the molecular air filter is constructed and arranged to maintain the concentration of airborne acids inside the wafer storage environment below 0.5 ppb molar.

30. The semiconductor wafer storage system of claim 27 wherein the molecular air filter comprises activated carbon particles impregnated with a basic reagent.

31. The semiconductor wafer storage system of claim 30 wherein activated carbon particles are in the size range of 6×140 U.S. mesh.

32. The semiconductor wafer storage system of claim 16 wherein the semiconductor device processing step is a photolithography processing step and the molecular air filter is constructed and arranged to remove airborne bases from the air provided from the semiconductor cleanroom to the storage environment targeted.

33. The semiconductor wafer storage system of claim 32 wherein the molecular air filter is constructed and arranged to maintain the concentration of airborne bases inside the wafer storage environment below 15 ppb molar.

34. The semiconductor wafer storage system of claim 32 wherein the molecular air filter is constructed and arranged to maintain the concentration of airborne bases inside the wafer storage environment below 5 ppb molar.

35. The semiconductor wafer storage system of claim 32 wherein the molecular air filter comprises activated carbon particles impregnated with an acidic reagent.

36. The semiconductor wafer storage environment of claim 32 wherein the molecular air filter comprises activated carbon particles impregnated with oxalic acid.

37. The semiconductor wafer storage system of claim 36 wherein activated carbon particles are in the size range of 6×140 U.S. mesh.

38. The semiconductor wafer storage environment of claim 32 wherein the molecular air filter comprises
    an upstream air filtering bed positioned to receive the air stream from the processing facility and comprising an upstream chemically active reagent selected to effectively remove the process-limiting molecular contaminant from the air stream as said air stream passes through the upstream air filtering bed, said upstream chemically active reagent releasing a characteristic volatile component into said air stream in sufficient quantity to be detrimental to the processing facility, and a downstream air filtering bed positioned to receive the air stream that has passed through said upstream air filtering bed and comprising a downstream reagent selected to remove the characteristic volatile component released by said upstream reagent into said air stream.

39. The air filtering system of claim 38 wherein said upstream reagent is sulfuric acid and said downstream reagent is a base.

* * * * *